(12) United States Patent
     Flud

(10) Patent No.: US 9,221,381 B1
(45) Date of Patent: Dec. 29, 2015

(54) ADJUSTABLE MAGNETIC TIE-DOWN

(71) Applicant: Nathan Flud, Bakersfield, CA (US)

(72) Inventor: Nathan Flud, Bakersfield, CA (US)

( * ) Notice: Subject to any disclaimer, the term of this patent is extended or adjusted under 35 U.S.C. 154(b) by 0 days.

(21) Appl. No.: 14/218,280

(22) Filed: Mar. 18, 2014

(51) Int. Cl.
    *B60P 7/08*     (2006.01)

(52) U.S. Cl.
    CPC ................................... *B60P 7/0807* (2013.01)

(58) Field of Classification Search
    CPC ..................................................... B60P 7/0807
    USPC .............. 410/96, 97, 100, 106, 110, 116; 24/265 CD, 302, 303; 224/403, 562; 248/499
    See application file for complete search history.

(56) References Cited

U.S. PATENT DOCUMENTS 5,800,106 A * 9/1998 Miller ........................... 410/117
6,524,041 B1 * 2/2003 Voiculescu .................... 410/100
8,167,263 B1 * 5/2012 Zampelli

* cited by examiner

*Primary Examiner* — Stephen Gordon
(74) *Attorney, Agent, or Firm* — R. Scott Kimsey, Esq.; Klein DeNatale Goldner

(57) ABSTRACT

An adjustable magnetic tie down includes a plate having an upper and lower surface, a tie-down, a fastener attached to the tie down, and a magnet attached to the lower surface of the plate. The tie down has a first end and a second end. The first end of the tie-down is attached to the plate, and the second end of the tie-down is attached to the fastener. The fastener is adapted to releasably engage the plate.

11 Claims, 6 Drawing Sheets

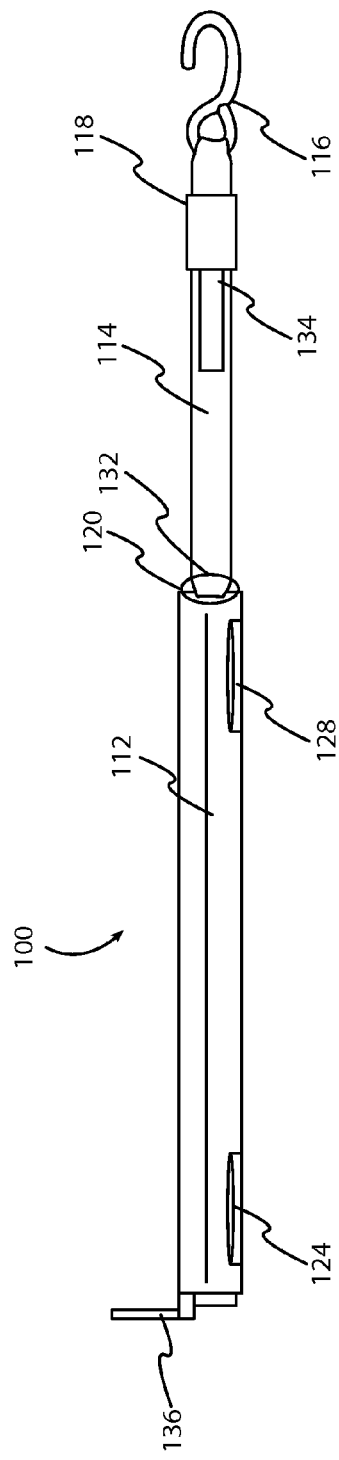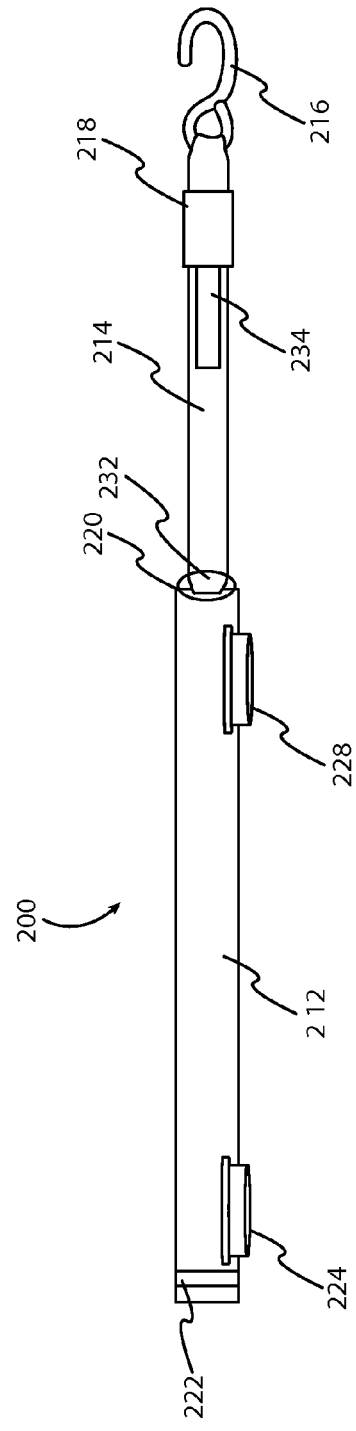
FIG. 4
FIG. 5

ADJUSTABLE MAGNETIC TIE-DOWN

RELATED APPLICATIONS

Not Applicable.

BACKGROUND OF THE INVENTION

1. Field of the Invention

The present invention relates generally to an adjustable tie-down, and more specifically to a portable, magnetic adjustable tie-down.

2. Background

Transport of a variety of objects requires tying those objects securely to the vehicle being used to transport them. Often, the vehicle being used to transport an item will not have a tie-down structure built thereon, and may not have the appropriate structures to allow a user to securely tie-down one or more items using straps, cords, or other tie-downs. Without a secure tie-down, transport of the one or more items may be dangerous.

Even when vehicles have structures allowing for tying-down with straps or the like, the structures available may vary widely from vehicle to vehicle, presenting problems with the items being tied-down have to be transported from one vehicle to the next.

SUMMARY OF THE INVENTION

The present portable, adjustable magnetic tie down includes a plate having an upper and lower surface, a tie-down, a fastener attached to the tie down, and a magnet attached to the lower surface of the plate. The tie down has a first end and a second end. The first end of the tie-down is attached to the plate, and the second end of the tie-down is attached to the fastener. The fastener is adapted to releasably engage the plate.

A tie-down adjuster may be provided between the second end of the tie-down and the fastener, with the tie-down adjuster engaging both the second end of the tie-down and the fastener. Adjustment of the tie-down changes the length of the tie-down between the first end of the tie-down and the fastener.

The tie-down adjuster may be a ratchet.

The fastener may be a hook.

The plate may be quadrilateral in shape, with first and second opposing edges and third and fourth opposing edges. The term quadrilateral, as used herein, encompasses plates with rounded edges. The quadrilateral-shaped plate may have four magnets attached thereto, one substantially at each corner (whether straight or rounded) of the plate. By "substantially at" it is contemplated that the magnets may be present as near to the edge as possible given the structural limitations of a magnet and the necessity of attaching the magnet to the lower surface of the plate, or that the magnet may be provided sufficiently toward the interior of the plate to provide room between the edge and the magnet, but that the magnet is positioned more closely to the edge of the plate than the center.

The magnets attached to the lower surface of the plate may be at least partially recessed into the lower surface of the plate.

The fastener may be a clip, bracket, or a ring.

The plate may include two fasteners, with one end of the tie-down adapted to attach to the first fastener and the second end of the tie-down adapted to attach to the second fastener.

BRIEF DESCRIPTION OF THE DRAWINGS

FIG. 4 is a side elevation view of one alternate embodiment of an adjustable magnetic tie-down device.

FIG. 5 is a side elevation view of one alternate embodiment of an adjustable magnetic tie-down device.

DETAILED DESCRIPTION OF THE INVENTION

Figure 1:
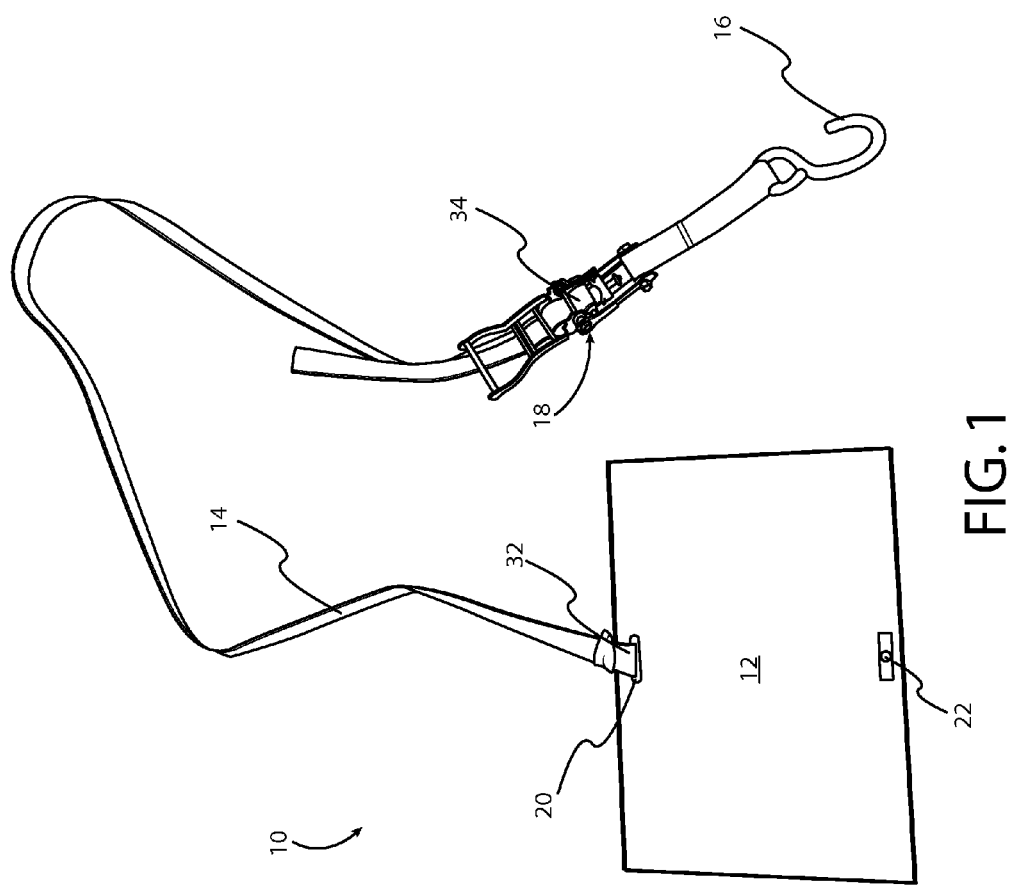
FIG. 1 is a top perspective view of one embodiment of an adjustable magnetic tie-down device.

Turning to the drawings, wherein like numerals indicate like parts, the numeral 10 indicates generally a portable, adjustable magnetic tie-down device of the present invention. Device 10 includes generally a plate 12 having first and second attachment portions 20 and 22 associated therewith, a tie-down strap 14, a ratchet 18, and a hook 16.

Plate 12 may be constructed of any suitable material, including any of a variety of plastic polymers, wood, metals, carbon fiber, or combinations of these materials. Plate 12 has an upper surface that is preferably flat and smooth and adapted to receive one or more items being secured to magnetic tie-down 10. The lower surface of plate 12 is shown in FIG. 2 and described more fully below. Plate 12 also includes a first attachment structure 20 and second attachment structure 22. In the embodiment shown in FIG. 1, these attachment structures are openings within plate 12 itself, though it is contemplated that brackets, hooks, or other suitable structures may be affixed to plate 12 to provide an attachment structure.

Tie-down 14 has a first end 32 and a second end 34. In the embodiment shown in FIG. 1, tie-down 14 is a strap, though it is contemplated that any suitable tie-down may be used in place of a strap. The first end 32 of tie-down strap 14 engages first attachment structure 20 and is securely attached thereto. Tie-down strap 14 also has an opposing second end 34. In the embodiment of magnetic tie-down device 10 shown in the drawings, second end 34 of tie-down strap 14 engages a ratchet 18, which allows for adjustment of the usable length of tie-down strap 14. A fastener, in this case hook 16, is also attached to ratchet 18. Hook 16 is adapted to engage with second attachment structure 22. Although a ratchet 18 is shown in the drawings, it is contemplated that in some embodiments of the present invention a tie-down of predetermined length may be provided with the invention, and that a fastener such as hook 16 is simply attached to the second end 34 of tie-down 14. First attachment structure 20 and second attachment structure 22 are preferably located at or near opposing side edges of plate 12, to allow the greatest space therebetween for receiving the one or more items to be secured to plate 12. It is contemplated, however, that first attachment structure 20 and second attachment structure 22 may be positioned in any suitable location.

FIG. 2 depicts the lower surface of plate 12 of magnetic tie-down device 10. In the embodiment shown, four magnets are associated with plate 12—first magnet 24, second magnet 26, third magnet 28, and fourth magnet 30. Each of said magnets is positioned at or near one of the corners of the underside of plate 12. In the embodiment shown in FIG. 2, each of said magnets is attached to the underside of plate 12 using a fastener 38. Magnets 24, 26, 28, and 30 extend away from the underside of plate 12. It is contemplated, however, that in some embodiments of a magnetic tie-down of the present invention, the various magnets may be received into openings in the underside of plate 12, and may be secured in those openings through the use of fasteners, adhesives, or any other suitable method. Also, although four magnets are shown in the figures, it is contemplated that a magnetic tie-down device of the present invention may include any suitable number of magnets, from one larger magnet to more than four smaller magnets.

Ratchet 18 is also visible in FIG. 2, having tie-down strap 14 associated with it at or near second end 34 of tie-down strap 14. Ratchet 18 is used to tighten or loosen tie-down strap 14, and operation of ratchet 18 increases or decreases the distance between the first end of tie-down strap 14, which is attached to first attachment structure 20 of plate 12, and hook 16, which attached to second attachment structure 22 of plate 12. The use of ratchets such as ratchet 18 is known in the art.

Figure 2:
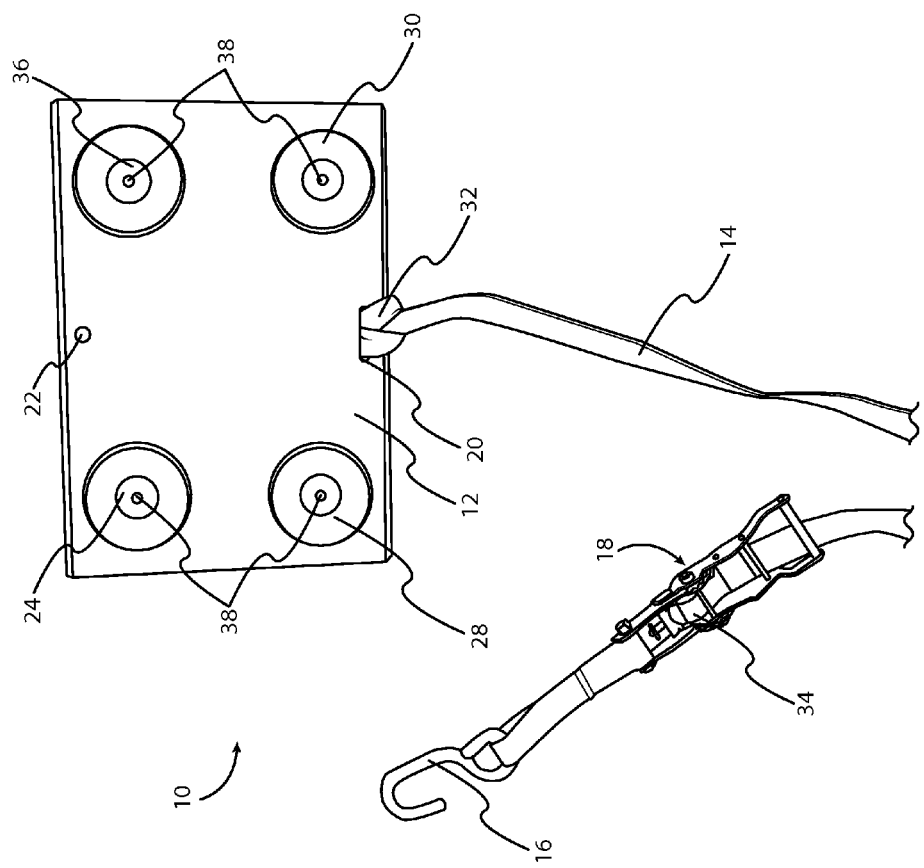
FIG. 2 is a bottom perspective view of the embodiment of an adjustable magnetic tie-down device shown in FIG. 1.
Figure 3:
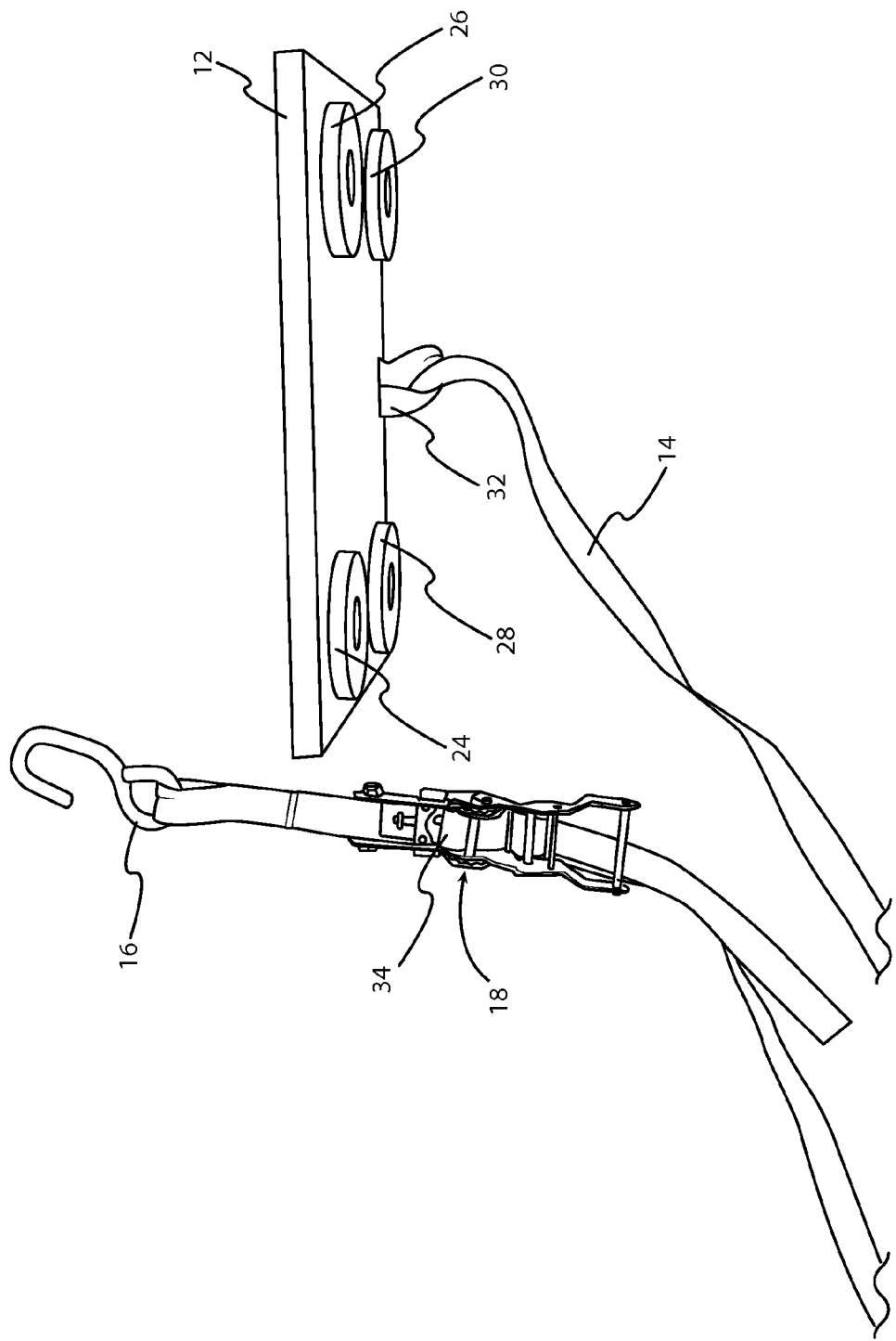
FIG. 3 is a side perspective view of the embodiment of an adjustable magnetic tie-down device shown in FIG. 1.

FIG. 3 provides a side view of the embodiment of adjustable magnetic tie-down device 10 shown in FIGS. 1 and 2. In this figure, the attachment of magnets 24, 26, 28, and 30 is more clearly seen, as is the extension of said magnets away from the lower surface of plate 12. In embodiments of the adjustable magnetic tie-down 10, such as that shown, wherein the magnets extend away from the lower surface of plate 12, the lower surface of plate 12, as well as the space between the lower surface of plate 12 and the surface on which plate 12 is placed, remains accessible. This space allows hook 16 to securely fasten to second attachment structure 22, and also allows a user to remove tie-down strap 14 from first attachment structure 20 should it become necessary to do so.

Figure 6:
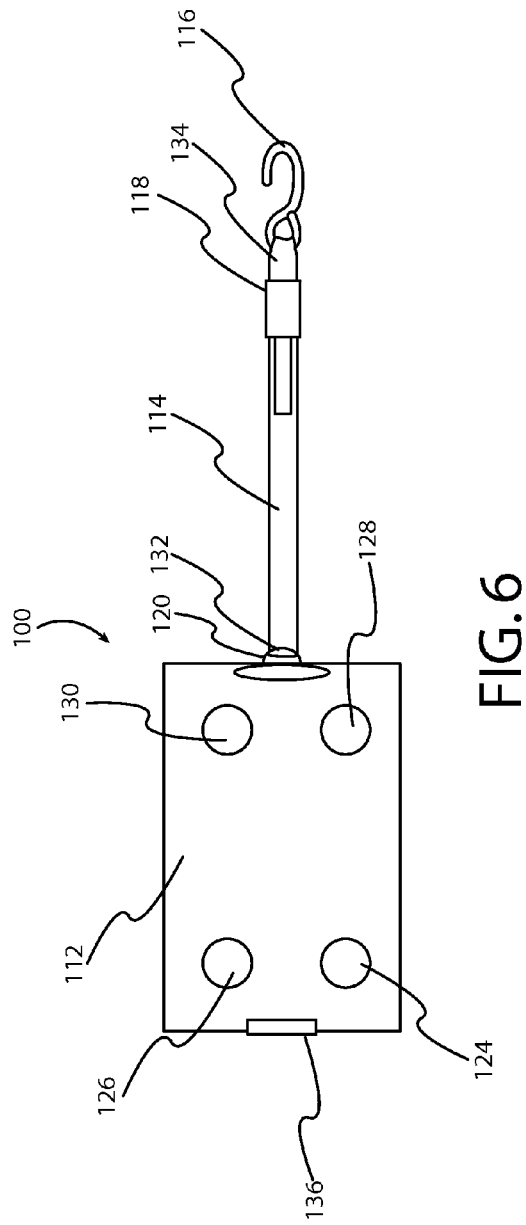
FIG. 6 is a top elevation view of the embodiment of an adjustable magnetic tie-down device shown in FIG. 4.

FIG. 4 is a side view of an embodiment of adjustable magnetic tie-down 100. As shown in the drawing, magnets 124 and 128 are recessed into the lower surface of plate 112 such that the lower surface of plate 112 is substantially flush with the surface upon which adjustable magnetic tie-down 100 is placed (two additional magnets are best shown in FIG. 6). Because there is no space between the bottom surface of plate 112 and the surface on which tie-down device 100 is resting, the attachment structures shown for attaching tie-down strap 114 to plate 112 in the embodiment shown in FIGS. 1 through 3 are not desirable.

First attachment structure 120 may be a ring or bracket or other secure structure attached to either an edge or the upper surface of plate 112. Likewise, the second attachment structure may be a bracket 136, or a ring or other secure structure attached to plate 112. Tie down strap 114 is shown attached to first attachment structure 120. An adjuster 118 is associated with tie-down strap 114 at or near second end 34 of tie-down strap 118. Adjuster 118 may be a ratchet or any other suitable device for adjusting the usable length of tie-down strap 114. A fastener, in this case hook 116, is attached to adjuster 118.

Plate 112 includes a second attachment structure associated therewith, and in the embodiment shown in FIG. 4, the second attachment structure is a bracket 136 fixedly attached to plate 112. Bracket 136 includes an opening therethrough for receiving a portion of hook 116 and provided a means for securing tie-down strap 114.

Figure 7:
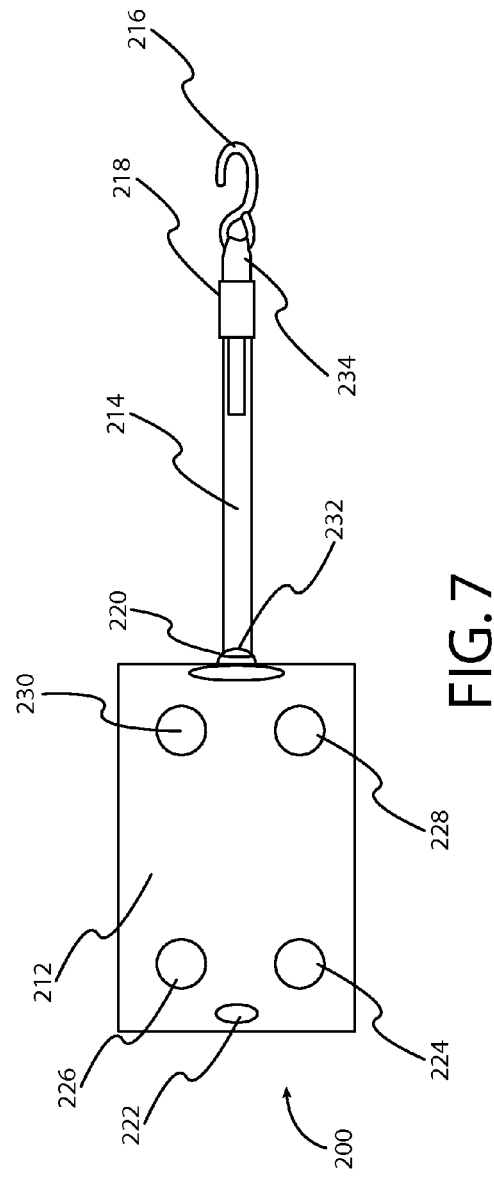
FIG. 7 is a top elevation view of the embodiment of an adjustable magnetic tie-down device shown in FIG. 5.

FIG. 5 shows an embodiment of an adjustable tie-down device 200 having a plate 212 with magnets 224 and 228 extending away from the lower surface thereof (two additional magnets are best shown in FIG. 7). The first attachment structure is a ring structure 220 to which first end 232 of tie-down strap 214 is fixedly attached. The ring structure 220 may extend through an opening in plate 212. Tie-down strap 214, adjuster 218, and hook 216 are substantially the same as described with respect to the embodiment shown in FIG. 4.

Plate 212 also includes an opening that comprises second attachment structure 222. Second attachment structure 222 is adapted to receive a portion of hook 216, thereby providing a way for a user to securely tie one or more items to plate 212 using tie-down strap 214.

FIG. 6 is a top view of the adjustable magnetic tie-down 100 shown in FIG. 4. Magnets 124, 126, 128, and 130, which are recessed into the lower surface of plate 112, are shown as dashed lines. Bracket 136 is shown extending from the upper surface of plate 112.

FIG. 7 is a top view of the adjustable magnetic tie-down 200 shown in FIG. 5. Magnets 224, 226, 228, and 230, which extend from the bottom surface of plate 212, are shown in dashed lines. Second attachment structure 222 is shown from above as an opening sized and shaped to receive a portion of hook 216.

Figure 8:
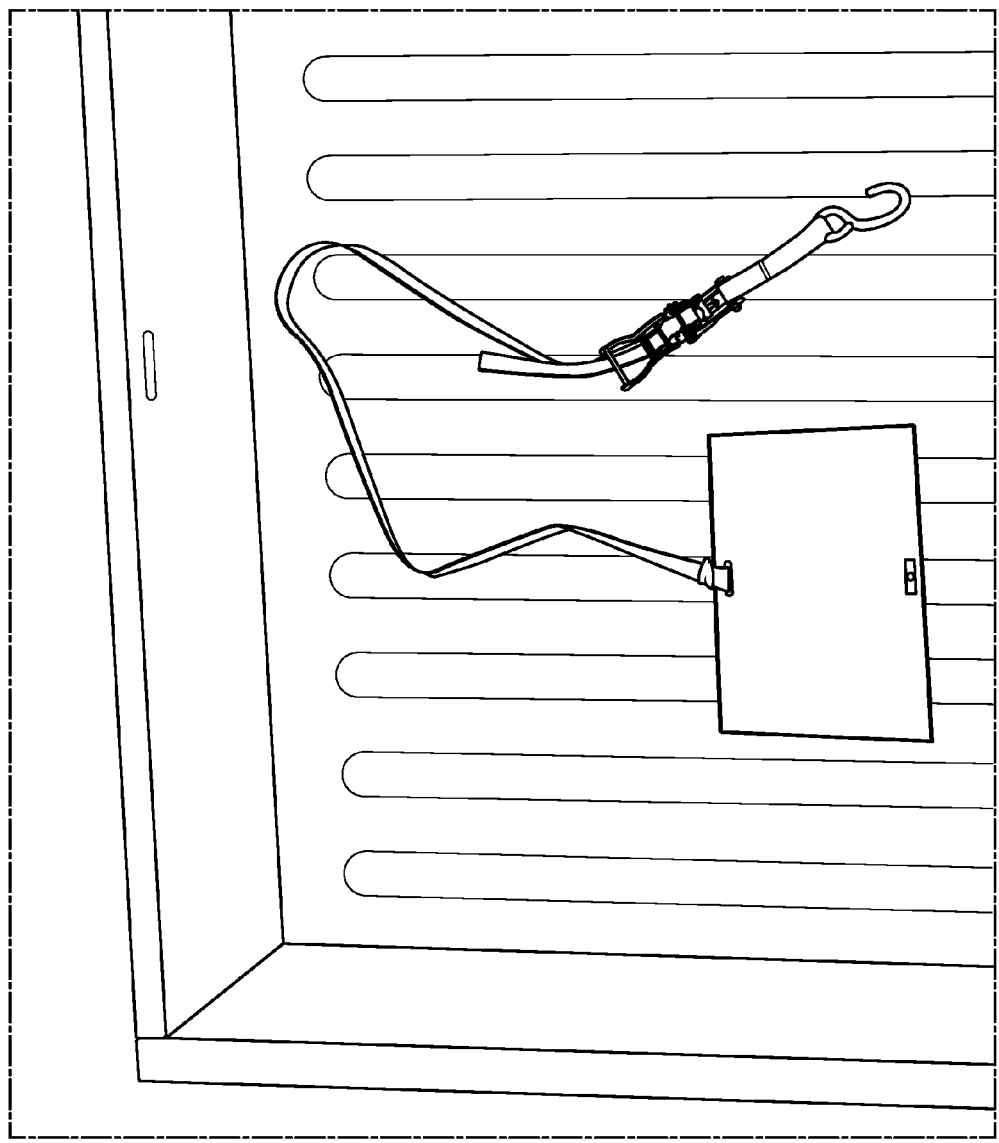
FIG. 8 is a top view of one embodiment of a magnetic tie-down device shown in the bed of a pickup truck.

FIG. 8 shows the device of FIGS. 1 through 3 disposed within the bed of a pickup truck.

The various embodiments of adjustable magnetic tie-down described herein may be used on any metallic surface to which the plate and associated magnets can be attached. Exemplary surfaces may include the bed of a pickup truck or other vehicle, a metal support structure such as a deck or other surface, or any mobile or stationary surface to which the magnets will attach and hold the plate securely.

One or more items to be secured to the plate and tied down may be positioned over the plate, and the tie-down strap extended thereover. At this point, there should be excess slack in the tie-down strap so that it can be extended over the one or more items to be secured to the plate and the fastener, such as a hook, can be attached to the second attachment structure on the plate. When the fastener is securely attached to the second attachment structure, the adjuster, such as a ratchet, may be used to tighten the tie-down strap. To release the one or more items being secured to the plate, the adjuster is used to loosen the tie-down strap until the fastener can be detached from the second attachment structure. At that point, the one or more items may be removed from the plate.

As noted above, the upper surface of the plate is preferably smooth and flat in the embodiments of the present invention shown in the figures. It is contemplated, however, that in some embodiments of the invention the plate may be provided with certain shapes or additional structures suited to a particular task. For example, the present device may be utilized to tie-down and transport a motorcycle or bicycle. Embodiments specifically designed for such uses may include a groove or other structure in the plate for receiving a wheel of the motorcycle or bicycle. Any suitable shaped or structures desirable for tying down certain items to the plate may be utilized.

It is to be understood that the various embodiments of the present invention shown and described above are exemplary, and are not intended to be limited. Various modifications to the device described herein may be readily apparent to those of skill in the art upon reading this disclosure, and such modifications are considered to be within the spirit and scope of the present invention. For example, in some embodiments of the invention, multiple tie-down straps or other tie-down structures may be utilized. In some cases, one end of each strap may be fixedly attached to the plate, with the tie-downs adapted to engage on another to securely fasten an object to the plate. Alternatively, a tie-down structure may be fixed attached to the plate at both ends, and may have an elastic quality such that the tie-down structure is extended so that an object can be inserted between the tie-down structure and the plate, and when the tie-down structure is released it retracts and secures the object. Any number, kind, and variety of tie-down structures may be combined with the present plate, and the tie-down structures as well as the plate may be constructed from any suitable material.

Having thus described the preferred embodiment of the invention, what is claimed as new and desired to be protected by Letters Patent includes the following:

1. A magnetic tie-down device comprising:
   a plate comprising an upper surface and a lower surface, a first edge, and an opposing second edge;
   a tie-down comprising a first end and a second end, the first end of said tie-down attached to said plate at the first edge thereof;
   an attachment structure at the second edge of said plate;
   a fastener attached to the second end of said tie-down, the fastener adapted to releasably engage said attachment structure; and
   a magnet fixedly attached to the lower surface of said plate.

2. The magnetic tie-down device according to claim 1, further comprising a tie-down adjuster between the second end of the tie-down and the fastener, the tie-down adjuster engaging said second end of the tie down and said fastener, wherein adjustment of said tie-down adjuster changes the length of said tie-down between the first end of the tie-down and the fastener.

3. The magnetic tie-down according to claim 2, wherein said tie-down is a strap and said adjuster is a ratchet.

4. The magnetic tie-down according to claim 1, wherein said fastener is a hook.

5. A magnetic tie-down device comprising:
   a plate comprising an upper surface and a lower surface, wherein said plate is quadrilateral in shape and comprises first and second opposing edges and third and fourth opposing edges, and further wherein a first magnet attached to the lower surface of the plate substantially at an intersection of the first and third edges;
   a tie-down comprising a first end and a second end, the first end of said tie-down attached to said plate;
   a fastener attached to the second end of said tie-down, the fastener adapted to releasably engage said plate;
   a second magnet attached to the lower surface of the plate substantially at an intersection of the first and fourth edges;
   a third magnet attached to the lower surface of the plate substantially at an intersection of the second and fourth edges; and
   a fourth magnet attached to the lower surface of the plate substantially at an intersection of the second and third edges.

6. The magnetic tie-down device according to claim 5, wherein said first, second, third, and fourth magnets are at least partially recessed into the lower surface of said plate.

7. A magnetic tie-down device comprising:
   a plate comprising an upper and lower surface;
   a tie-down comprising a first end and a second end, the first end of said tie-down attached to said plate at a first edge thereof;
   an attachment structure attached to said plate at a second edge thereof;
   a fastener attached to the second end of said tie-down, the fastener adapted to releasably engage said attachment structure;
   a ratchet attached to said tie-down for adjusting the length of said tie-down; and
   a magnet fixedly attached to the lower surface of said plate.

8. The magnetic tie-down device according to claim 7, wherein said magnet is at least partially recessed into the lower surface of said plate.

9. The magnetic tie-down device according to claim 7 wherein the fastener is a first fastener selected from the group consisting of a clip, a bracket, and a ring.

10. The magnetic tie-down device according to claim 1, wherein the attachment structure is an opening defined in said plate.

11. The magnetic tie-down device according to claim 1, wherein the first end of the tie-down is releasably attached to said plate.

* * * * *